(12) United States Patent
Silverman (10) Patent No.: US 7,761,353 B1
(45) Date of Patent: Jul. 20, 2010

(54) VALIDATING FINANCIAL ACCOUNTS

(75) Inventor: Alexander E. Silverman, Mercer Island, WA (US)

(73) Assignee: Amazon Technologies, Inc., Incline Village, NV (US)

(*) Notice: Subject to any disclaimer, the term of this patent is extended or adjusted under 35 U.S.C. 154(b) by 1086 days.

(21) Appl. No.: 11/296,095

(22) Filed: Dec. 7, 2005

(51) Int. Cl.
*G06Q 40/00* (2006.01)

(52) U.S. Cl. .............................. 705/35; 705/34; 705/40; 705/43; 705/66; 273/139; 455/415; 707/100; 713/155

(58) Field of Classification Search .................. 705/34, 705/40, 43, 66; 273/139; 455/415; 707/100; 713/155
See application file for complete search history.

(56) References Cited

U.S. PATENT DOCUMENTS

| 7,502,760 | B1* | 3/2009 | Gupta .......................... 705/66 |
| 2001/0014881 | A1* | 8/2001 | Drummond et al. ........... 705/43 |
| 2001/0032181 | A1* | 10/2001 | Jakstadt et al. ................ 705/40 |
| 2002/0004772 | A1 | 1/2002 | Templeton et al. ............ 705/35 |
| 2002/0026394 | A1* | 2/2002 | Savage et al. ................. 705/34 |
| 2004/0036212 | A1* | 2/2004 | Walker et al. ................ 273/139 |
| 2005/0120201 | A1* | 6/2005 | Benaloh et al. .............. 713/155 |
| 2005/0165681 | A1* | 7/2005 | Heinemann et al. ........... 705/40 |
| 2005/0182774 | A1* | 8/2005 | Weir et al. ................... 707/100 |
| 2006/0052091 | A1* | 3/2006 | Onyon et al. ................. 455/415 |
| 2006/0059088 | A1* | 3/2006 | Krikorian et al. .............. 705/40 |
| 2006/0116960 | A1* | 6/2006 | Gillin et al. ................... 705/40 |
| 2006/0212391 | A1* | 9/2006 | Norman et al. ................ 705/40 |

FOREIGN PATENT DOCUMENTS

DE            199 26 472        12/2000

* cited by examiner

*Primary Examiner*—James P Trammell
*Assistant Examiner*—Sanjeev Malhotra
(74) *Attorney, Agent, or Firm*—Seed IP Law Group PLLC (57) ABSTRACT

Techniques are described related to validating financial accounts, such as before allowing the use of the financial accounts in making payments or otherwise being used as part of transactions. In some situations, the validating of a financial account includes corroborating that a user who desires to use the financial account is the account holder for the account or is otherwise authorized to use the account, such as by confirming that the user has access to information about transactions involving the account and that the user has access to at least one physical item that is delivered to an address or other location associated with the user. This abstract is provided to comply with rules requiring an abstract, and it is submitted with the intention that it will not be used to interpret or limit the scope or meaning of the claims.

45 Claims, 8 Drawing Sheets

Example Bank Account Transaction Information

ABC Bank Checking Account 111-111111-1          Statement Closing Date: 08/01/XX User XYZ
1234 Main Street
AnyTown, AnyState AnyZip Beginning Balance:   $123.00
Deposits:            $15.23
Withdrawals:         $8.23
Ending Balance:      $130.00

| | | 111b | 111c | 111d | 111e |
|---|---|---|---|---|---|
| | 111a | | | | |
| | Date | Description | Withdrawals (-) | Deposits (+) | Current Balance |
| 112a | 07/23/XX | PPS-PPP Validation Dep – 12345 | - | $0.18 | $132.18 |
| 112b | 07/24/XX | PPS-PPP Validation Dep – 56789 | - | $0.05 | $132.23 |
| | ... | | | | |

VALIDATING FINANCIAL ACCOUNTS

TECHNICAL FIELD

The following disclosure relates generally to techniques for validating a financial account, such as to corroborate that a user is the account holder for a bank account before allowing the user to make payments from the bank account.

BACKGROUND

The Internet comprises a vast number of computers and computer networks that are interconnected through communication links, with information being exchanged using various services such as electronic mail and the World Wide Web (also referred to as the "Web"). In addition to providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

Although the Web allows users to engage in shopping and other commerce-related transactions involving the exchange of monetary payments, a variety of problems exist related to making such payments using financial accounts of the users (e.g., bank accounts such as checking accounts and savings accounts, credit card accounts, debit card accounts, etc.). For example, fraudulent activities by consumers can be difficult for merchants and others doing payment processing to detect and eliminate, such as when dishonest consumers attempt to make payments using financial accounts that belong to other users (e.g., when the financial account information has been stolen), using financial accounts that do not exist, or using financial accounts that are not currently active. In addition, various other problems exist with respect to using at least some types of financial accounts for monetary payments, including for credit card use (e.g., many purchasers do not have credit cards or available credit, many sellers do not accept credit cards, the fees charged by credit card companies can be problematic, etc.) and for debit-based payments via electronic funds transfer ("EFT"), such as payments from a bank account using the Automated Clearing House (or "ACH") system (e.g., purchasers may have less protection from fraudulent activity on their accounts than from credit card use, etc.).

DETAILED DESCRIPTION

Techniques are described related to validating financial accounts, such as before allowing the use of the financial accounts in making payments or otherwise being used as part of transactions. In at least some embodiments, the validating of a financial account includes corroborating that a user who desires to use the financial account is the account holder for the account or is otherwise authorized to use the account, such as by confirming that the user has access to information about transactions involving the account and that the user has access to at least one physical item that is delivered to an address or other location associated with the user.

In at least some embodiments, an account validation system performs the validating of a financial account associated with a user, such as an account validation system that is associated with one or more merchants who may generate transactions involving the financial account (e.g., transactions that include making one or more withdrawals from the account, making one or more deposits to the account, providing one or more credits for the account, etc.) and/or that is associated with one or more payment processing systems that process payments associated with such transactions. Furthermore, the techniques may be used in at least some embodiments with one or more of a variety of types of financial accounts, including checking accounts, savings accounts, credit card accounts, debit card accounts, and any other form of account or mechanism for storing financial value to which monetary amounts may be added and/or from which monetary amounts may be deducted in a manner such that an associated user can obtain information about such transactions.

In at least some embodiments, the validating of a financial account associated with a user by the account validation system includes (a) performing one or more transactions with the financial account, (b) causing a physical item to be physically delivered to an address or other location associated with the user, and (c) confirming that the user can respond with account validation identifier information that is obtained from the physically delivered item and that is identifiable using transaction information from the one or more performed transactions, as described in greater detail below. In some embodiments, the user may further be provided with a reward for performing the account validation and/or for use of the validated financial account as part of one or more transactions, such as to encourage such activities. Such actions allow the account validation system to verify that the account exists and is usable (e.g., based on the success of the one or more performed transactions), as well as to corroborate that the user who indicated the account is authorized to use the account (e.g., based on the user having access to both the transaction information for the account and the physical item that is delivered). Moreover, in at least some embodiments the account validation system performs the actions in such a manner as to discard the information about the one or more performed transactions before performing the confirming step, as described in greater detail below, thus minimizing the amount of information that is stored and obviating the need to retain potentially sensitive transaction-related information.

Figure 1A:
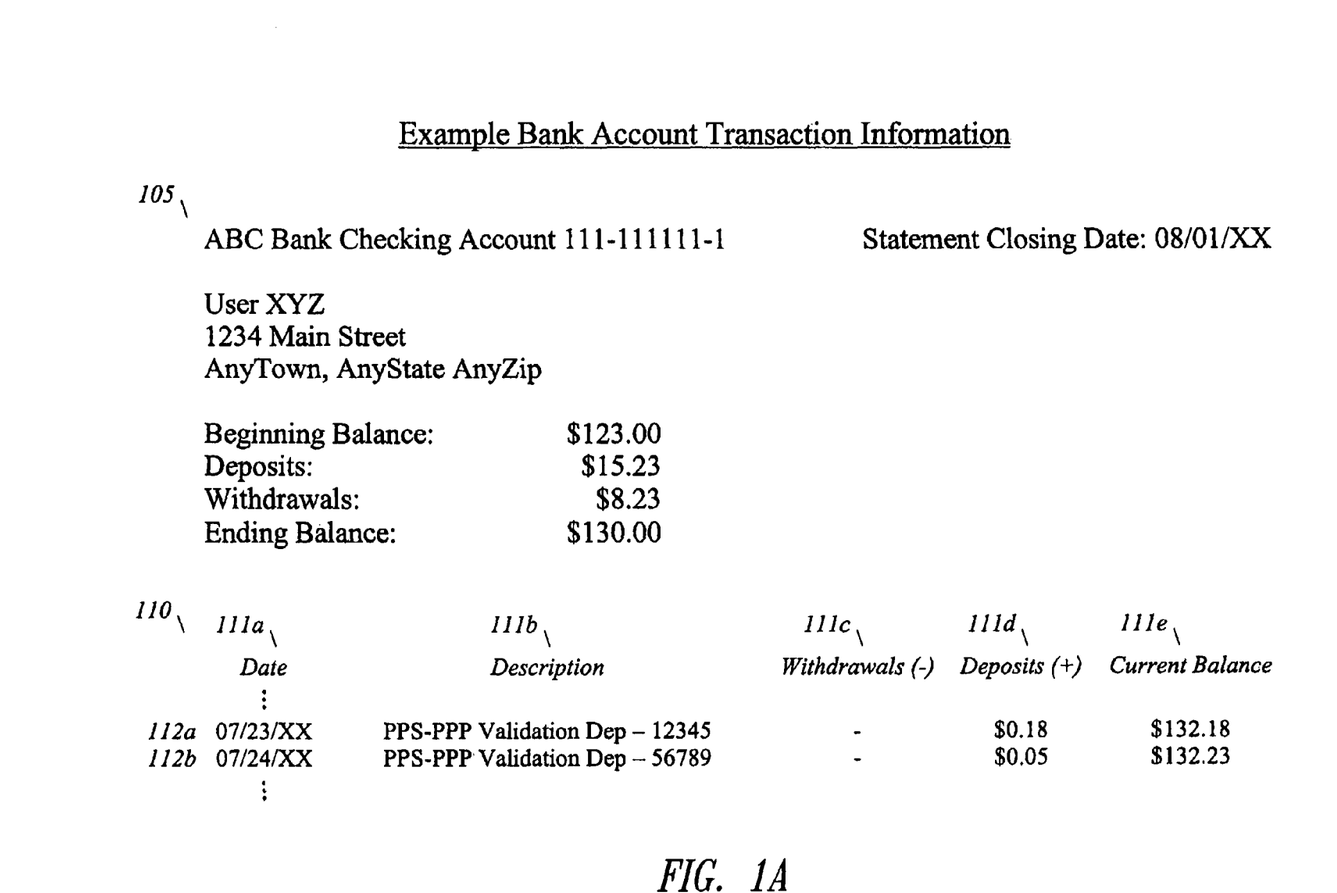
FIGS. 1A-1C illustrate examples of using information as part of validating financial accounts.
Figure 1B:
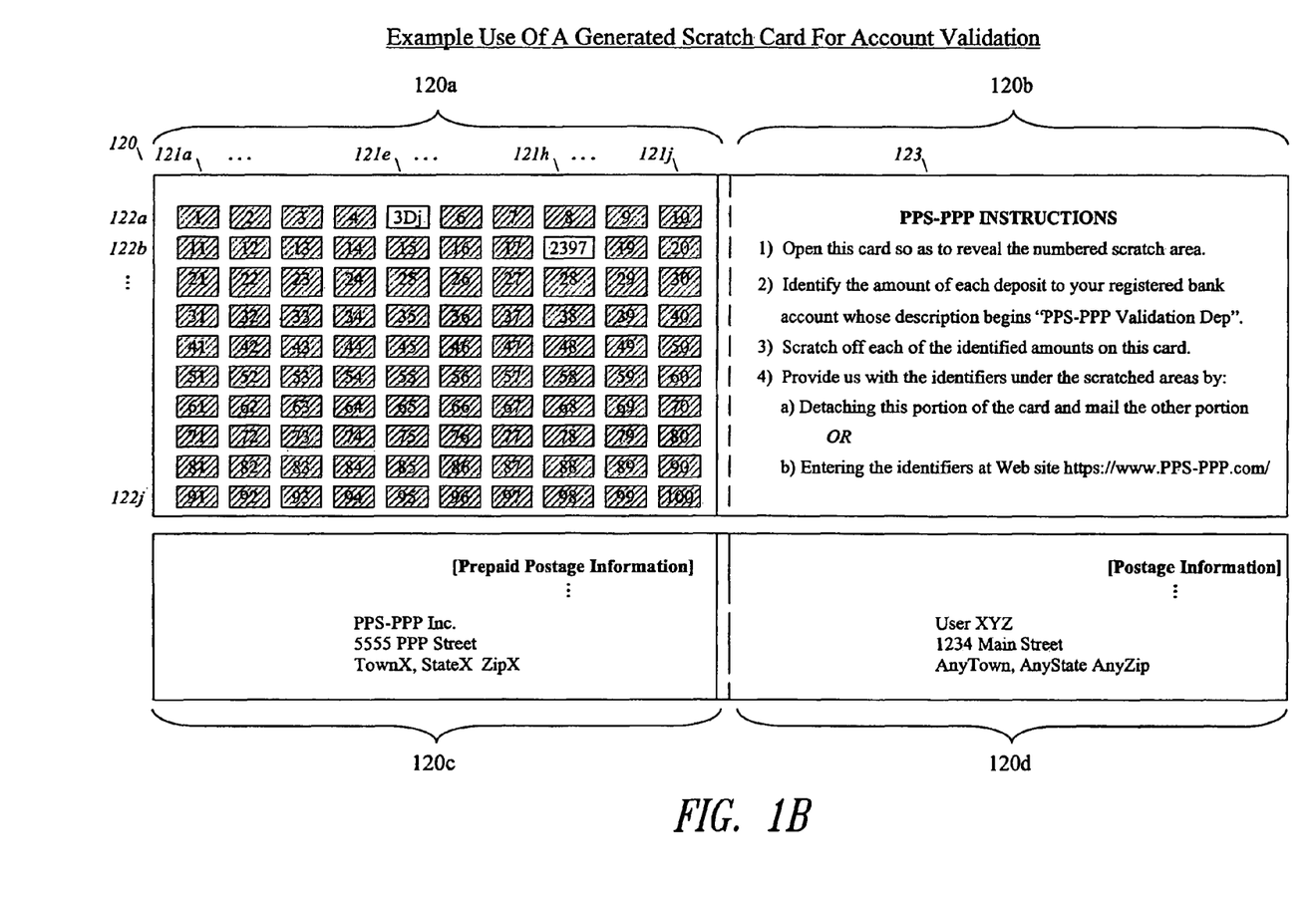
Figure 1C:
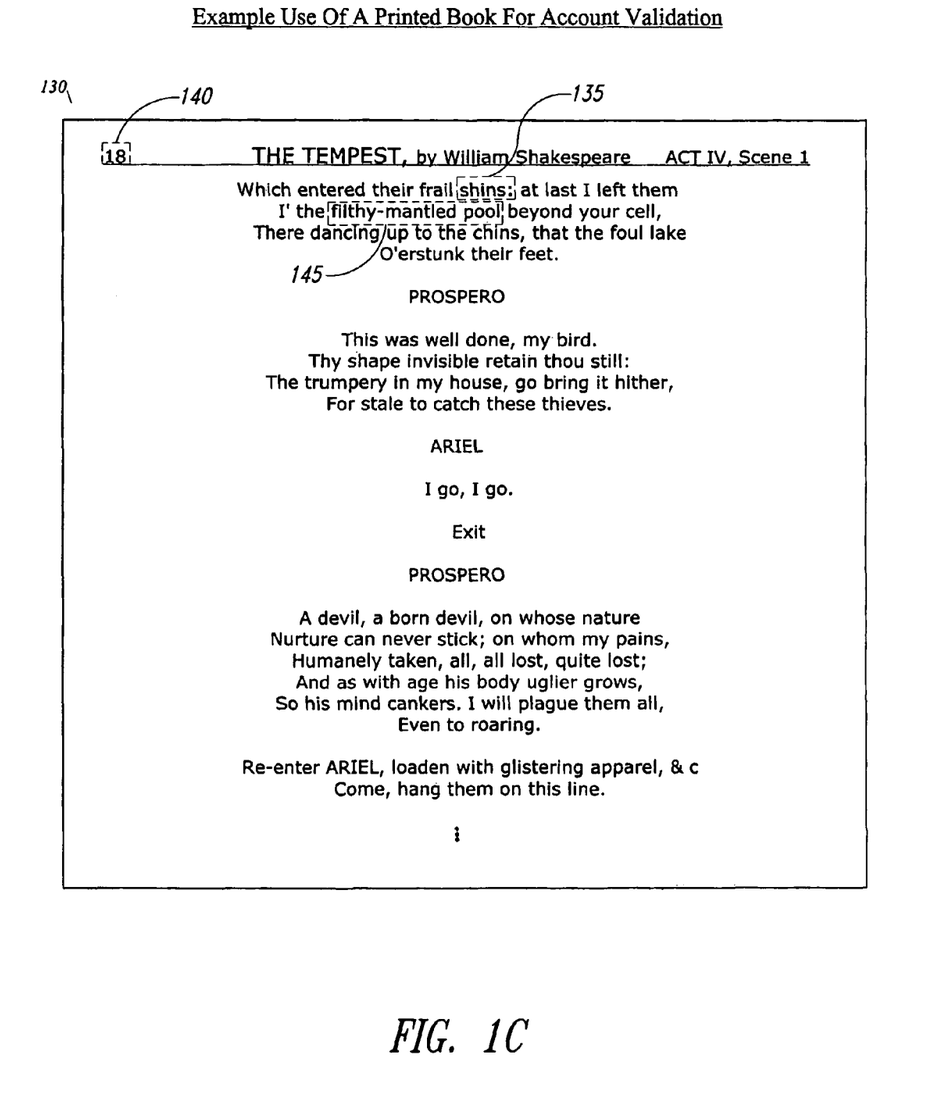

FIGS. 1A-1C illustrate examples of using information as part of validating financial accounts. For illustrative purposes, some embodiments are described below in which disclosed techniques are used with specific types of financial accounts, with specific types of transactions that are performed with the financial accounts, with specific types of physical items that are delivered to users, with specific types of information from the physical items that is used as account validation identifiers, and with specific manners of identifying the account validation identifier information from the delivered physical items. However, the inventive techniques can be used in a wide variety of other situations, and thus the invention is not limited to the specific illustrative details that are discussed.

In particular, FIG. 1A illustrates an example of account status information 105 that may be provided to an account holder of an example checking account, such as via a monthly paper statement that is mailed to the account holder. In this example, User XYZ is the account holder, the checking account is provided by ABC Bank, and the account validation system is a payment processing system PPS-PPP, such as on behalf of one or more affiliated merchants or instead as part of a standalone payment processing service. In some situations, the account holder or other authorized individual may have access to information regarding the checking account in manners other than a physically delivered paper statement, such as via an interactive electronic mechanism (e.g., access via a Web site provided by ABC Bank), whether in addition to or instead of paper statements.

The example account status information 105 for the checking account includes a summary of the account's balance and activities over the period of time being reported (e.g., a month ending on the indicated statement closing date of August 1st), as well as the address on file for User XYZ to which a paper statement may be physically delivered. In addition, the example account status information 105 includes transaction information 110 to provide details regarding transactions that have occurred for the checking account during the period of time covered by the statement. In this example, the transaction information includes various information for each transaction, including a date 111a, a textual description 111b, an indication of a corresponding withdrawal 111c or deposit 111d, and a current balance of the account 111e, although other types of information may be displayed by other banks or for other types of financial accounts.

As previously noted, in at least some embodiments the account validation activities include performing one or more transactions with a financial account that is being validated, and in this example the information for the checking account reflects multiple transactions that were previously performed by the PPS-PPP payment processing system as part of the process of validating the checking account. In particular, the example illustrated transactions include two transactions 112a and 112b that were previously performed by the PPS-PPP system so as to make small deposits of randomly selected amounts of a dollar or less, with the two example transactions including deposits of eighteen cents and five cents. In other embodiments, other types of transactions could be performed, such as withdrawals, whether instead of or in addition to the deposits (e.g., to make a deposit of a randomly selected amount and then to make a corresponding withdrawal of the same amount).

In this example, the monetary amounts of the deposits will later be used by User XYZ to identify appropriate account validation identifiers for validating the checking account, as discussed in greater detail with respect to FIGS. 1B and 1C, although in other embodiments other types of transaction information could be used as part of the account validation, whether instead of or in addition to the transaction amounts. For example, in this illustrative embodiment the description 111b of each of the deposits by the PPS-PPP system includes not only an identifier of the account validation system (which in this example is "PPS-PPP Validation Dep") to allow the user to identify the appropriate deposits for use in determining the account validation identifiers, but also includes a unique alphanumeric identifier generated for each transaction by the system (which in these examples are "12345" and "56789"). While such additional transaction-specific information is not used in this illustrative embodiment as part of the account validation process, in other embodiments such information may be used in a variety of ways, such as to assist in the determining of appropriate account validation identifiers and/or to be provided back to the account validation system along with the determined account validation identifiers as a further verification that the responding user had access to the transaction information for the financial account.

FIG. 1B illustrates an example of a physical item that is generated and physically delivered to a user as part of the account validation process for a financial account associated with the user, such as for use by the user in determining one or more account validation identifiers selected by the account validation system and provided with the physical item or in a manner accessible by use of the physical item. In this example, the physical item provided to the user is a printed card 120 that is mailed to the user (e.g., as a postcard), as indicated in section 120d of the item. As indicated, the physical address to which the card is mailed is in this example the same address on record for the checking account of the user (as indicated in information 105 of FIG. 1A), although in other embodiments the two addresses to which the bank information and the physical item are delivered may be different (or the bank information may not be physically delivered to the user at all). The address used for sending the item to User XYZ may be determined in various ways, such as based on address information provided by the user to the account validation system as part of the account validation process, based on interactions or cooperation with the ABC Bank so as to send the item to the address of record for the account holder of the account, based on address information previously provided by the user to a merchant or payment processing system affiliated with the account validation system, and/or based on information obtained from a third-party (e.g., a publicly accessible database).

In this example, the card 120 further includes a section 120b that includes instructions 123 to User XYZ to provide assistance in using the item to determine the appropriate account validation identifier(s), a section 120a with numerous candidates or choices of possible account validation identifiers, and a section 120c that is part of a return postcard with prepaid postage. In particular, in this example the card 120 is mailed to the user in a folded manner such that section 120d is visible on the front of the card for use in delivery of the card to the user, section 120b is visible on the back of the folded card for use by the user, and sections 120a and 120c are not initially visible while the card is folded (e.g., by being affixed by tape and/or glue). After the user unfolds the card, the other half of the card 120 with sections 120a and 120c is revealed, which in this example are detachable from sections 120b and 120d by tearing or cutting along an indicated dotted line (e.g., that is perforated to allow for easy detachment). The user can then send back the portions 120a and 120c of the card after the appropriate account validation identifiers have been selected in section 120a, with section 120c used to deliver the return postcard to the account validation system (or an affiliated processing service), and with the section 120a used to identify the selected account validation identifiers.

In this example, the instructions 123 direct the user to identify the amounts of the deposits to the checking account by the account validation system, and to then select the account validation identifier candidates in section 120a that correspond to those amounts. After the account validation identifiers are selected, the user can in this example provide the selected identifiers to the account validation system by returning the detached postcard or by electronically providing the selected identifiers to the account validation system via an indicated secure Web site—in other embodiments, other mechanisms for providing the selected identifiers may be used, and only one such mechanism may be available. In addition, while the instructions are provided to the user in this example as part of the physical item that is provided to the user, in other embodiments the instructions may be provided in another manner, such as via a separate item (e.g., a paper) that is physically delivered to the user and/or is delivered via electronic means (e.g., as part of an interactive Web site, an email, a text message, a voicemail or other voice message, etc.).

In this example, the account validation identifier candidates in section 120a include 100 candidates shown in a 10×10 square, with each candidate having an associated distinct numerical amount between 1 and 100. In addition, the identifier candidates in this example are provided as part of a scratch card, such that the candidate identifiers are not initially visible due to being covered by a user-scratchable material (e.g., material similar to that typically used with scratch-off lottery cards) that obscures the identifiers, although in other embodiments the candidate identifiers may instead be obscured in other manners (e.g., by being under break-open coverings that can be removed to reveal the candidate identifiers) or instead be visible. Section 120a is shown in this example after the user has scratched off the covering material for the candidates corresponding to the numerical amounts of five and of eighteen (shown at column 121e and row 122a, and at column 121h and row 122b), revealing the selected alphanumeric account validation identifiers of "3Dj" and "2397" in this example. In other embodiments, a different number of selected account validation identifiers may be used (e.g., one), such as based on a different number of deposits (e.g., one) and/or a different manner of selecting an appropriate account validation identifier (e.g., by using two deposit amounts that indicate a row and column, by combining the two deposit amounts via addition so as to use the amount of twenty-three, etc.).

In the illustrated embodiment, the illustrated card 120 is generated by the account validation system after the amounts of the two deposits are selected, with the appropriate account validation identifiers "3Dj" and "2397" able to be generated or otherwise determined in a variety of ways (e.g., in a random manner that is unrelated to the deposit amounts; in a manner that is based on the deposit amounts, such as by using a one-way hash function that prevents the deposit amounts from being determined from the resulting account validation identifiers; etc.). In other embodiments, the card may be produced in other manners, such as by generating multiple such cards in advance that each have numerous distinct identifier candidates, and then selecting the already existing identifier candidates on a selected card that match the determined transaction amounts to be the appropriate account validation identifiers. In addition, while the card in this example is a scratch card with the non-selected account validation identifiers remaining obscured, in other embodiments all of the account validation identifier candidates may instead be visible to the user. Also, in this example the alphanumeric account validation identifier candidates are selected in such a manner as to inhibit random guessing of the identifiers, such as by using a sufficient number of characters to ensure a sufficient number of possible identifier values (e.g., at least 10,000 values), such as by using at least four characters if the characters are limited to numeric digits 0-9 or at least three characters if the characters include alphabetic characters in addition to numeric characters. In other embodiments, the account validation identifiers may be selected in other manners and have other forms (e.g., a password for use in accessing an account of the user or in accessing secure information to be made available to the user as part of validating the financial account, an encryption or decryption key, various types of information associated with the user and/or the financial account, etc.).

After the appropriate account validation identifiers are determined by the account validation system, the account validation system will in at least some embodiments discard some or all details regarding the transaction (such as the deposit amounts used to identify the appropriate account validation identifiers), and may retain only the determined account validation identifiers for use in later determining whether the identifiers returned by the user match those identifiers. After the user later returns the account validation identifiers that he/she selects from the physical item using the transaction information, the account validation system determines if those identifiers match the appropriate account validation identifiers for the account, and if so the account validation system in the illustrated embodiment validates the checking account so as allow further transactions involving the checking account to be performed by the user (e.g., to make payments to others and/or to the PPS-PPP system from the checking account). In other embodiments, additional types of validation may further be performed, such as to take further steps to corroborate or ensure a user's identity or other associated information.

FIG. 1C illustrates an example of an alternative type of physical item that is delivered to a user for use in selecting appropriate account validation identifiers. In particular, in this example the physical item is a previously existing book that is sent to the user, with words or other information from the book used as the account validation identifier candidates. For example, the user may be sent a copy of a book and be provided with instructions (e.g., on a separate item, such as an insert to the book or on a bookmark) that indicate how to use the transaction information to identify the appropriate account validation identifiers. In this example, the instructions (not shown) would indicate to use the amount of the first deposit to select a page of the book and to use the amount of the second deposit to identify a word on that page, resulting in the fifth word of the eighteenth page of the book being the appropriate account validation identifier for this example (which in this situation would be "shins", as shown on the example illustrated page 130, which is an example eighteenth page of an example book "The Tempest" by William Shakespeare—in this example, the account validation identifier word "shins" is shown inside dotted line 135 and the page number "18" is shown inside dotted line 140 for the purposes of clarity for the reader, although the dotted lines would not be present in the actual book available to the user). The user could then provide that account validation identifier back to the account validation system in various ways. Furthermore, while in some embodiments the deposit amounts may be chosen in a manner independent of the words to be used, in other embodiments the words to be used may instead be selected in such a manner as to inhibit random guessing of the words, such as by selecting unusual words or phrases from among a set of candidate books. For example, the phrase "filthy-mantled pool" (shown inside dotted line 145 in this example for the benefit of the reader) may be an appropriate unusual phrase that could instead be selected as an account validation identifier, since the phrase is unlikely to occur often (if at all) in other possible books that may be used for this purpose—if so, the second deposit may be made in an amount of 13 in this example (since "filthy" is the thirteenth word) and the instructions (not shown) may indicate to select a 3-word phrase starting with the indicated word.

In addition, in some embodiments such a book may be provided to the user as a form of reward to motivate the user to perform the validation of the account and use the payment services offered by the PPS-PPP payment processing service. Alternatively, the book may instead be an item that was already identified as having been previously delivered to the user (e.g., recently) or being an item that will be delivered to the user soon (e.g., based on the user or another user having ordered the item for the user). Furthermore, in embodiments in which the provided book or other item is intended as a reward, the user may further be allowed to select from one of a number of possible books or other types of items that contain information that may be used as account validation identifiers (e.g., CDs or other items containing music such that words from song titles or lyrics may be used as account validation identifiers, or other items on which are encoded one or more pieces of information that are perceivable by a user and that may be used as account validation identifiers), or more generally from among multiple types of items. In addition, in some embodiments, the item to be provided may be printed on demand or otherwise generated for a particular user (e.g., after selection by the user of the item or item type), such as to allow instructions to be added as part of the item, to allow information that is to be used as account validation identifiers to be added or changed with respect to the typical contents of the item, and/or to allow user-specific information to be included. Moreover, in some embodiments such instructions and/or items may be provided to users in other manners, such as by electronically transmitting that information to the user (e.g., as an e-book, downloaded audio, an email, one or more Web pages, a voice message, an executable applet or other program to be executed on a computing device of the user, etc.), with the user instructed to interact with the electronically provided item in an appropriate manner to select the appropriate account validation identifiers (e.g., to provide the indicated transaction information as input to an executable applet in order to receive in response the appropriate account validation identifiers from the applet).

Thus, a variety of types of transaction-related information for financial accounts may be used to direct users in a variety of ways to select or otherwise identify appropriate account validation identifiers using items provided to the users. After the account validation system receives the appropriate one or more account validation identifiers from a user for a financial account, the financial account may then be made available for use with financial transactions, such as those involving the user.

Figure 2:
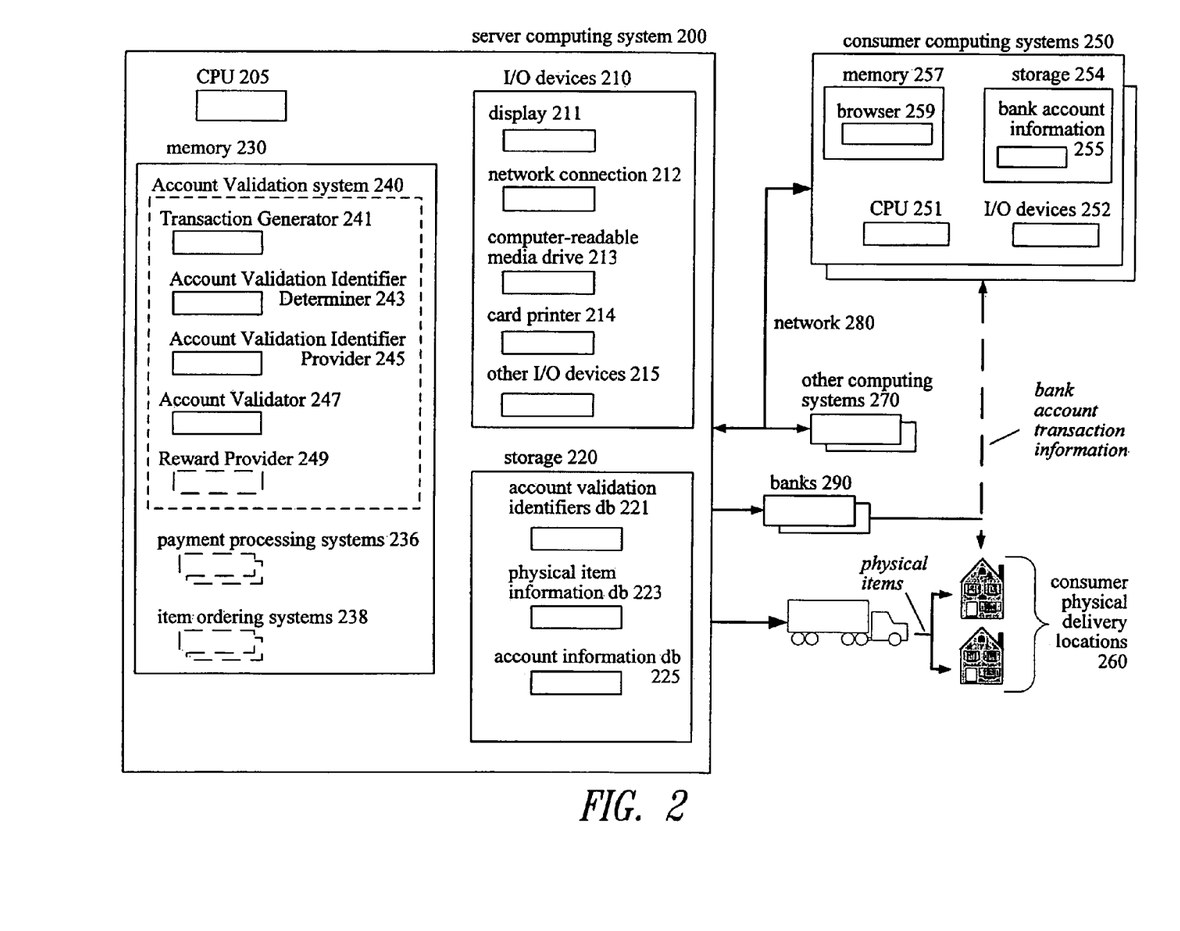
FIG. 2 is a block diagram illustrating an embodiment of a computing system suitable for executing an embodiment of an Account Validation system.

FIG. 2 illustrates an example embodiment of a server computing system 200 that is suitable for use in validating financial accounts. The computing system 200 includes a CPU 205, various input/output ("I/O") devices 210, storage 220, and memory 230. The I/O devices include a display 211, a network connection 212, a computer-readable media drive 213, a card printer 214 (e.g., a printer capable of producing scratch cards of the types discussed herein), and other I/O devices 215.

In this illustrated embodiment, an Account Validation system 240 is executing in memory 230 in order to perform account validation activities for financial accounts. Such account validation activities may be initiated in some embodiments by consumers or other users so as to enable use of their own financial accounts, such as from one or more client computing systems 250 over network 280 by using browsers 259 executing in memory 257 of the computing systems 250 and by providing information 255 from storage 244 about bank accounts or other financial accounts of those users. In other embodiments, the Account Validation system may instead receive requests to validate accounts from other sources, such as from payment processing systems that process payments using users' financial accounts and/or from other systems that may generate transactions involving the users' accounts, such as based on information provided from the users to those other systems. Moreover, the Account Validation system may in some embodiments execute in conjunction or affiliation with one or more payment processing systems and/or with one or more item ordering systems that generate transactions based on users ordering or otherwise acquiring items, such as optional payment processing systems 236 and optional item ordering systems 238 executing in memory 230, or instead other payment processing systems and transaction generating systems (not shown) on other computing systems (e.g., on other computing systems 270). Moreover, in at least some embodiments transactions involving financial accounts may occur in a variety of other ways, including based on interactions directly between two or more users. Additional details regarding some example types of transactions are included in U.S. patent application Ser. No. 10/894,350, filed Jul. 19, 2004 and entitled "Performing Automatically Authorized Programmatic Transactions," and in U.S. patent application Ser. No. 11/200,880, filed Aug. 9, 2005 and entitled "Providing Payments Automatically In Accordance With Predefined Instructions," each of which is hereby incorporated by reference in its entirety.

In the illustrated embodiment, after the Account Validation system receives a request to validate a financial account of a user, a Transaction Generator component 241 generates one or more transactions involving the financial account, such as by interacting with a bank 290 that provides the financial account, by interacting with an appropriate payment processing system, or by otherwise interacting with a transaction processing system (not shown) that will perform those transactions. After the transactions have been performed on the financial account, information about those transactions will be made available to an account holder or other authorized user for the financial account, such as upon request and/or by periodically sending such account information. For example, the banks 290 may each provide transaction and other account information for the financial accounts provided by the bank to the appropriate account holders, such as in a form that is electronically accessible from computing systems 250 in use by the account holder users and/or in a manner so as to be physically delivered to physical delivery locations 260 associated with those users, such as home or other addresses. Information about the financial accounts being validated is also stored by the Account Validation system in an account information database ("db") data structure 225 on storage 220 in the illustrated embodiment, and in some embodiments may further be provided to one or more other systems, such as other affiliated payment processing systems and/or item ordering systems.

In addition, in the illustrated embodiment, an Account Validation Identifier Determiner component 243 of the Account Validation system determines one or more appropriate account validation identifiers to be used to validate the financial account of a user, and information about the appropriate account validation identifier(s) is provided to the user by the Account Validation Identifier Provider component 245 of the Account Validation system. In particular, in at least some embodiments one or more physical items are delivered to a physical delivery location 260 associated with the user, although in other embodiments the user may obtain the physical items in other manners (e.g., by physically retrieving the item from a designated location, such as after providing appropriate confirmation of identity, by already being in possession of the item, etc.). In the illustrated embodiment, the Account Validation Identifier Determiner component 243 and/or the Account Validation Identifier Provider component 245 store information about the appropriate account validation identifiers in an account validation identifier database data structure 221 on storage 220, such as in a manner that does not include any indications of or information about the transactions generated by the Transaction Generator component.

After the one or more transactions have been generated for a financial account and the account validation identifier information has been provided to a user associated with the financial account, in the illustrated embodiment the Account Validator component 247 of the Account Validation system receives information from the user indicating one or more selected account validation identifiers. The component 247 then compares the received identifiers to the appropriate account validation identifiers for the financial account that are stored in the account validation identifier database 221, and validates the financial account for use (e.g., by modifying information about the financial account in the account information database 225) if the received identifiers match the stored appropriate account validation identifiers.

While not illustrated, the Account Validation system may further discard any information about the generated transactions for a financial account before the Account Validator component performs its validation activities for that financial account. In addition, the components 243 and 245 may further in some embodiments use information about physical items from a physical item information database data structure 223 on storage 220, such as for use in generating a new physical item (e.g., a scratch card) and/or to identify appropriate information in an existing physical item (e.g., an indicated word on an indicated page of a book).

In the illustrated embodiment, the Account Validation system also includes an optional Reward Provider component 249, such as to provide one or more rewards or other compensation to users who perform account validation activities, such as upon success of those activities or otherwise. In at least some embodiments, the physical items provided to the users may be part or all of the reward provided, and if so the component 245 may interact with the component 249 as appropriate in order to identify appropriate items to provide to the user. In addition, in some embodiments the transactions that are performed on a financial account may be part or all of the reward provided to the user (e.g., based on an amount of a monetary deposit to the account), and if so the component 241 may interact with the component 249 as appropriate (e.g., to determine an appropriate amount of the deposits). In other embodiments, no such reward is provided to users, or a reward may be provided in other manners (e.g., as a discount or credit available from an item ordering service for future item orders, or from a payment processing system for fees associated with future payment processing) or at other times.

It should be appreciated that computing systems 200, 250 and 270 are merely illustrative and are not intended to limit the scope of the present invention. For example, computing system 200 may instead be comprised of multiple interacting computing systems or devices, and may be connected to other devices that are not illustrated, including through one or more networks such as the Internet or via the World Wide Web ("Web"). For example, in some embodiments at least some of the various Account Validation system components may be distributed across multiple computing systems (e.g., the Transaction Generator and Account Validator components executing on separate computing systems), or more generally may be provided or controlled by distinct entities. More generally, a "client" or "server" computing system or device may comprise any combination of hardware or software that can interact in the manners described, including (without limitation) desktop or other computers, network devices, PDAs, cellphones, cordless phones, devices with walkie-talkie and other push-to-talk capabilities, pagers, electronic organizers, Internet appliances, television-based systems (e.g., using set-top boxes and/or personal/digital video recorders), and various other consumer products that include appropriate inter-communication and computing capabilities. In addition, the functionality provided by the illustrated system components may in some embodiments be combined in fewer components or distributed in additional components, and in some embodiments the functionality of some of the illustrated components may not be provided and/or other additional functionality may be available.

It should also be appreciated that, while various elements are illustrated as being stored in memory or on storage while being used, these elements or portions of them can be transferred between memory and other storage devices, such as for purposes of memory management and data integrity. Alternatively, in other embodiments some or all of the software components may execute in memory on another device and communicate with the illustrated computing system via inter-computer communication. Some or all of the system components or data structures (and/or other contents) may also be stored (e.g., as software instructions or structured data) as contents of a computer-readable medium, such as a hard disk, a memory, a computer network or cellular wireless network or other data transmission medium, or a portable media article (e.g., a DVD or flash memory device) to be read by an appropriate drive or via an appropriate connection. Some or all of the system components and data structures (and/or other contents) may also be transmitted as contents of generated data signals (e.g., by being encoded in a carrier wave or otherwise included as part of an analog or digital propagated signal) on a variety of computer-readable data transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 3:
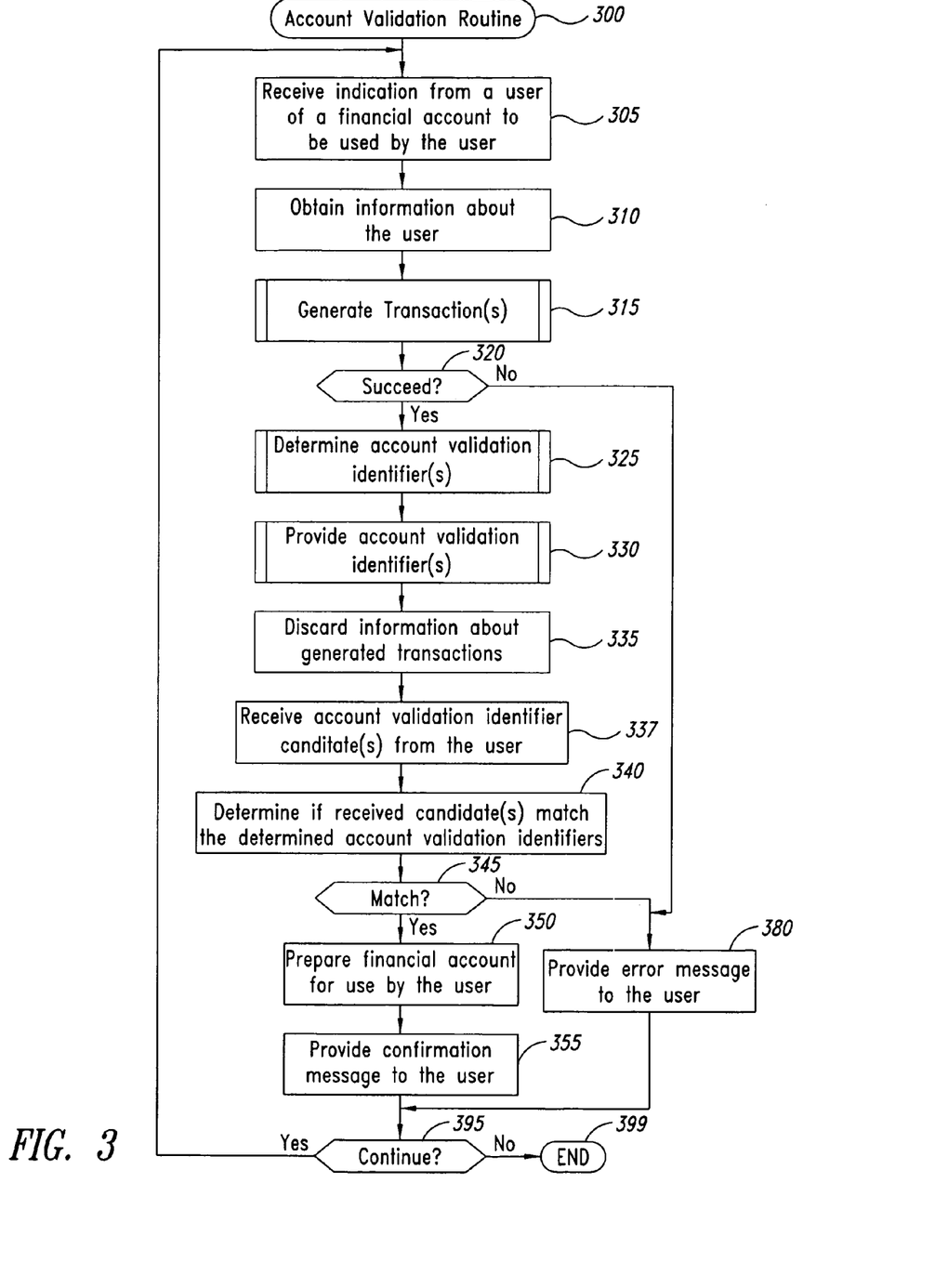
FIG. 3 is a flow diagram of an example embodiment of an Account Validation routine.

FIG. 3 is a flow diagram of an embodiment of an Account Validation routine 300. The routine may, for example, be provided by execution of an embodiment of the Account Validation system 240 of FIG. 2, such as to in this illustrated embodiment receive indications of financial accounts to be validated, perform one or more transactions involving each of the accounts, provide information to users to allow them to use transaction information from those transactions to select appropriate account validation identifiers using one or more items provided to each of the users, and enable use of the financial account if the user supplies the appropriate account validation identifiers.

The routine begins in step 305, where an indication is received from a user of a financial account that the user desires to use as part of future transactions. The routine continues to step 310 to obtain information about the user, such as by interactively querying the user to identify a physical address of the user and any additional needed information about the financial account, or by retrieving previously provided or otherwise accessible such information. The routine then continues to execute subroutine 315 to generate one or more transactions involving the financial account that will cause corresponding transaction information to be made available to the account holder for the account, and to provide a response indicating whether the transaction(s) succeeded and optionally including details of the transactions. If it is determined in step 320 that the transactions did not succeed, the routine continues to step 380 to provide an error message to the user indicating that the account has not been validated.

If it was instead determined in step 320 that the transactions succeeded, the routine continues to execute subroutine 325 to determine one or more appropriate account validation identifiers for use with the account, and to provide a response that includes indications of those account validation identifiers. The routine then executes subroutine 330 to provide the account validation identifiers to the user as part of one or more items that are provided to the user. In step 335, the routine in the illustrated embodiment then discards all information about the generated transactions, including the monetary amounts of the deposits or other types of transactions used, but retains indications of the determined account validation identifiers for use in step 340. In particular, after the routine receives in step 337 one or more account validation identifier candidates selected by the user, the routine determines in step 340 if the received identifier candidates match the determined account validation identifiers. If not, the routine continues to step 380, but if so the routine continues instead to step 350 to prepare the financial account for use by the user, and then provides a confirmation message to the user in step 355 to indicate that the account validation was successful. After steps 355 or 380, the routine continues to step 395 to determine whether to continue. If so, the routine returns to step 305, and if not continues to step 399 and ends.

Figure 4:
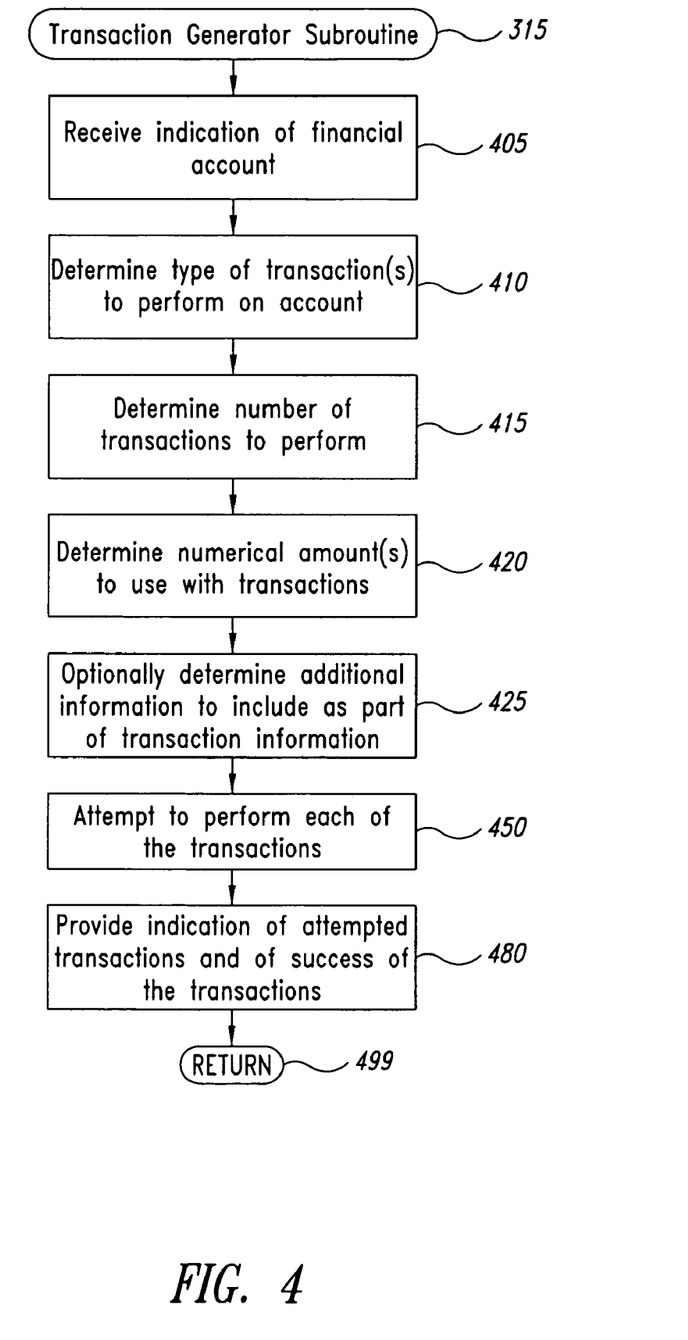
FIG. 4 is a flow diagram of an example embodiment of a Transaction Generator subroutine.

FIG. 4 is a flow diagram of an embodiment of a Transaction Generator subroutine 315. The subroutine may, for example, be provided by execution of an embodiment of the Transaction Generator component 241 of FIG. 2, such as to in this illustrated embodiment determine one or more transactions to be performed with respect to an indicated financial account and to attempt to perform each of those transactions.

The subroutine begins in step 405, where an indication is received of a financial account being validated for a user. In the illustrated embodiment, the subroutine continues to step 410 to determine one or more types of transactions (e.g., deposits, withdrawals, etc.) to be performed for the account (e.g., based on the type of the account and/or information about the user), to step 415 to determine a number of transactions (e.g., one or two) to be performed (e.g., based on the determined types of transactions, the type of the account and/or information about the user), and to step 420 to determine one or more numerical amounts (e.g., amounts corresponding to micro-deposits or micro-withdrawals) to use with the transactions to be performed (e.g., based on the determined types of transactions, the determined number of transactions, the type of the account and/or information about the user). In other embodiments, some or all of the steps 410-420 may instead not be performed, such as if the same type(s) of transactions, number of transactions and/or transaction amounts are used for all accounts or for groups of related accounts (e.g., all accounts of an indicated type), such as to always perform 2 micro-deposits whose amounts within a specified range are randomly selected. In addition, the determination of the amount for use with a transaction may be performed in a variety of ways, including by selecting amounts within an enumerated group of possible amounts.

After step 420, the subroutine optionally determines in step 425 additional information to include as part of the transaction information, such as transaction-specific information to be included as part of a description of the transaction and/or as part of the identification of the entity performing the transaction, although in some embodiments such additional information may not be used. The subroutine then continues to step 450 to attempt to perform each of the transactions, although subsequent transactions may not be attempted if an earlier transaction attempt fails. In step 480, the subroutine then provides indications of the success or failure of the attempted transactions and optionally provides details of the transactions, such as the numerical amounts used with the transactions. The subroutine then returns to step 499.

Figure 5:
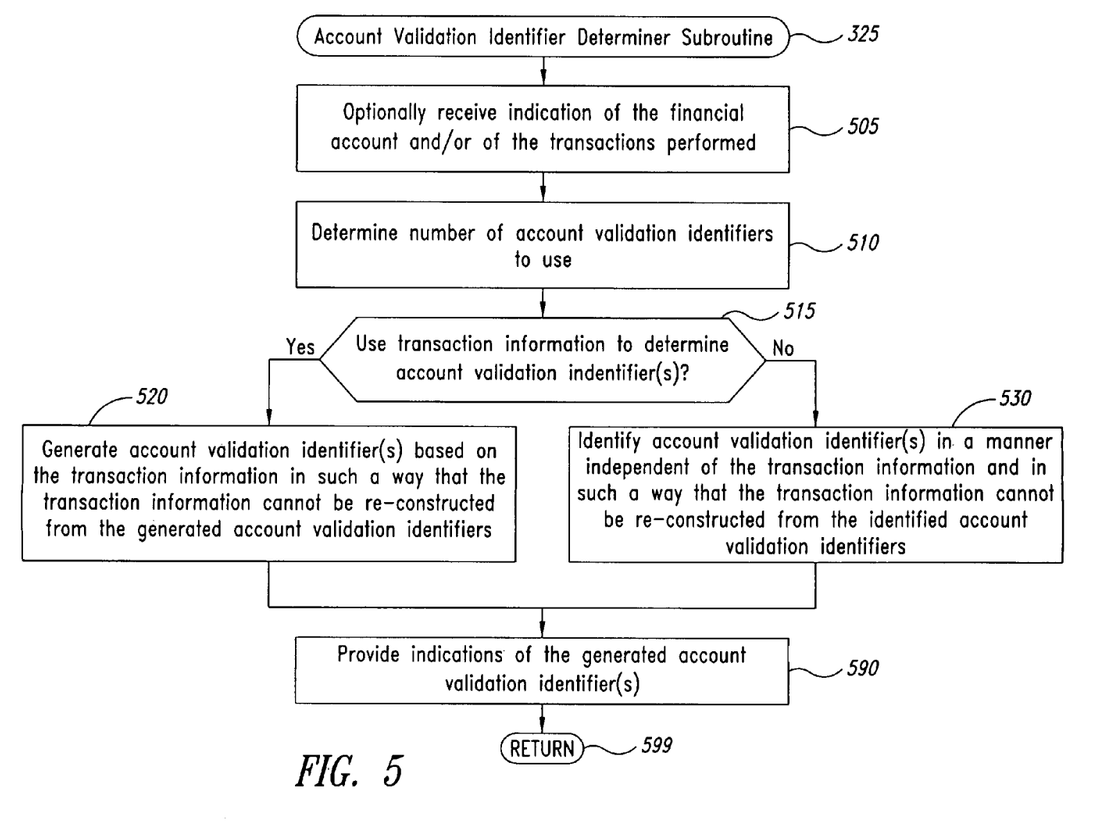
FIG. 5 is a flow diagram of an example embodiment of an Account Validation Identifier Determiner subroutine.

FIG. 5 is a flow diagram of an embodiment of an Account Validation Identifier Determiner subroutine 325. The subroutine may, for example, be provided by execution of an embodiment of the Account Validation Identifier Determiner component 243 of FIG. 2, such as in this illustrated embodiment to determine one or more account validation identifiers to be used as part of validating a financial account.

The subroutine begins in step 505, where indications are optionally received of the financial account to be validated and/or of information about the transactions that were performed (e.g., the numerical amounts of the transactions). The subroutine then continues to step 510 to determine a number of account validation identifiers to use (e.g., one or two), such as based on a number of transactions performed, although in other embodiments the same number of account validation identifiers may be used for all accounts or for all accounts of a particular type. In some embodiments, the account validation identifiers may be generated based at least in part on transaction-related information (e.g., the numerical amounts of the transactions), while in other embodiments the account validation identifiers may be identified in a manner that is independent of the transaction-related information. Thus, in the illustrated embodiment, the subroutine next continues to step 515 to determine whether to use the transaction information as part of determining the account validation identifiers, although in some embodiments such a determination may not be made (such as if the transaction information is always or never used as part of determining the account validation identifiers).

In the illustrated embodiment, if the transaction information is to be used as part of determining the account validation identifiers, the subroutine continues to step 520 to generate one or more account validation identifiers based on the transaction information, such as on the numerical amounts of the transactions. In the illustrated embodiment, the generation is performed in such a manner that the transaction information that is used cannot be re-constructed or otherwise identified from the generated account validation identifiers (e.g., by using a one-way hash function; by selecting information from an existing item, such as words from a book; etc.). Alternatively, if the transaction information is not to be used as part of determining the account validation identifiers, the subroutine continues instead to step 530 to identify one or more account validation identifiers in a manner independent of the transaction information, with the identifying being performed in the illustrated embodiment in such a way that the transaction information cannot be re-constructed or otherwise identified from the identified account validation identifiers (e.g., by selecting them in a random manner from a range or other enumeration of possible identifier values). After steps 520 or 530, the subroutine continues to step 590 to provide indications of the determined account validation identifiers, and in step 599 returns.

Figure 6:
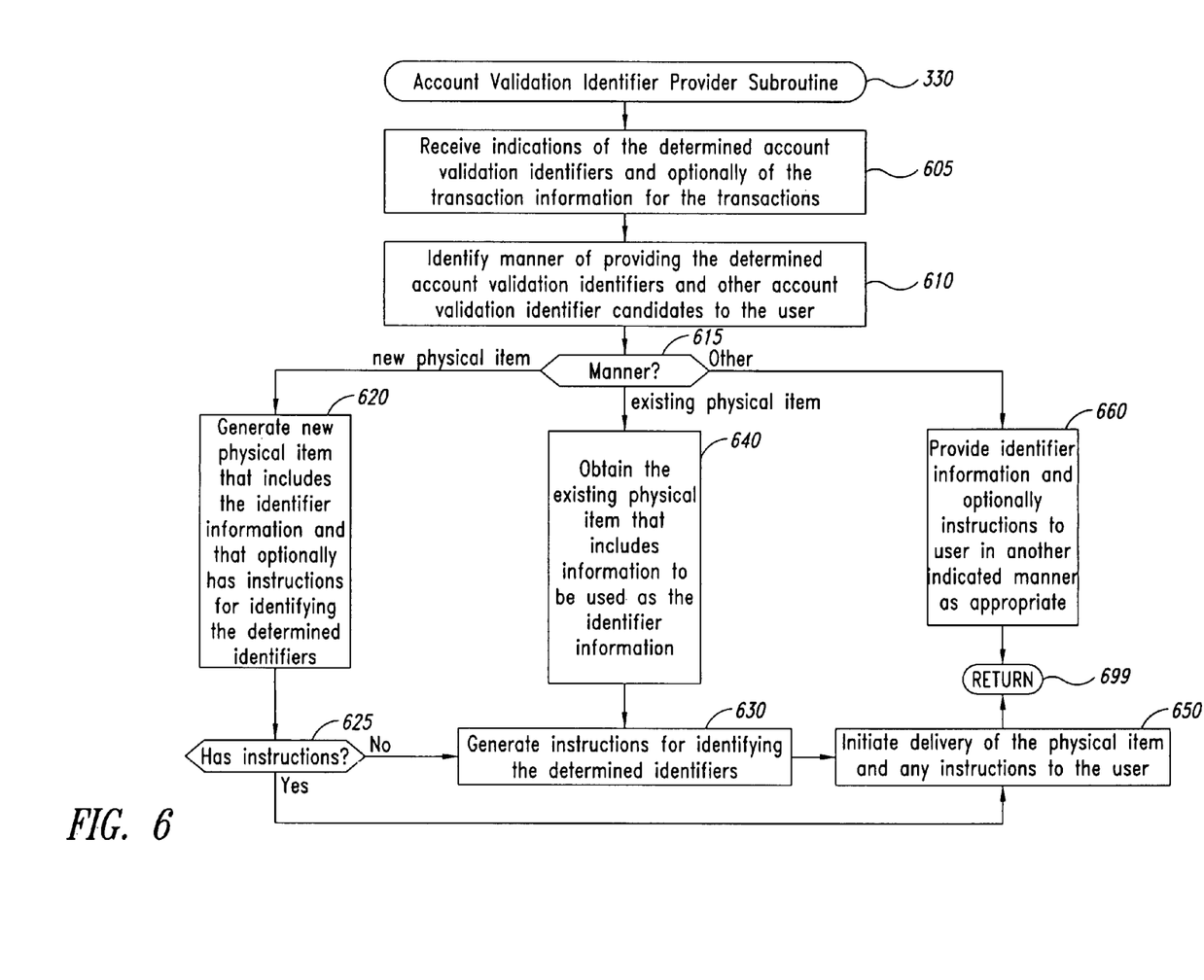
FIG. 6 is a flow diagram of an example embodiment of an Account Validation Identifier Provider subroutine.

FIG. 6 is a flow diagram of an example embodiment of an Account Validation Identifier Provider subroutine 330. The subroutine may, for example, be provided by execution of an embodiment of the Account Validation Identifier Provider component 245 of FIG. 2, such as in this illustrated embodiment to provide the determined account validation identifiers to the user as part of an item provided to the user or in a manner such that the determined account validation identifiers are otherwise identifiable based on such an item.

The subroutine begins in step 605, where one or more indications are received of the determined account validation identifiers and optionally of the transaction information for the transactions, such as if the item to be provided will include indications of the transaction information along with the determined account validation identifiers (e.g., to indicate the numerical amounts for a transaction in a manner associated with the appropriate account validation identifiers, such as for a scratch card physical item). The subroutine continues to step 610 to identify a manner of providing the determined account validation identifiers and other possible candidates for such identifiers to the user (e.g., by generating a scratch card to be sent, by generating another type of physical item to be sent, by selecting an existing physical item to be sent, by selecting an existing physical item that the user already has, by generating or selecting an item to be sent electronically, etc.), although in other embodiments the identifiers may be provided in the same manner for all accounts or all accounts of a particular type.

If it is then determined in step 615 that the identified manner includes generating a new physical item to be physically delivered to the user, the subroutine continues to step 620 to generate the new physical item in such a manner as to include the account validation identifier information in a manner appropriate for that type of item, and further in such a manner as to optionally include instructions for identifying the determined identifiers as part of the generated item. The subroutine then continues to step 625 to determine whether the generated item has the instructions, and if so continues to step 650 to initiate delivery of the physical item to the user.

If it was instead determined in step 615 that the identified manner is to physically deliver an existing physical item to the user, the subroutine continues to step 640 to obtain the existing physical item that includes information to be used as the account validation identifiers. After step 640, or if it was instead determined in step 625 that the generated physical item did not have instructions, the subroutine continues to step 630 to generate the instructions for identifying the determined identifiers, and continues to step 650 to initiate delivery of the physical item and the instructions. In other embodiments, the physical item may be provided to the user in other manner, such as by providing instructions to an appropriate item ordering service, or if the physical item was already provided to the user.

If it was instead determined in step 615 that the identified manner is not to send a new or existing physical item, the subroutine continues instead to step 660 to provide the identifier information and optionally the instructions to the user in another indicated manner as appropriate, such as to send them in an electronic form. After steps 650 or 660, the subroutine continues to step 699 and ends.

It should be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other embodiments the operations may be performed in other orders and in other manners, including using a variety of types of programming models and paradigms (e.g., object-oriented programming, procedural programming, logical and other declarative programming, service-oriented architectures, etc.). In addition, the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method, comprising:
receiving an indication of a financial account of a user for use with financial transactions involving the user; and
automatically validating use of the financial account by,
initiating one or more deposits to the financial account for use in validating the financial account, each deposit being of a determined amount, the initiating of the one or more deposits being performed by one or more programmed computing systems;
initiating physical delivery of an item to a location associated with the user, the item having multiple distinct account validation identifier candidates for the account such that each of the multiple account validation identifier candidates is identifiable from the item using one or more numerical amounts, at least one of the multiple account validation identifier candidates being identifiable using the determined amounts of the one or more deposits;
providing instructions for identifying one or more of the multiple account validation identifier candidates from the delivered item by using amounts of the initiated one or more deposits, the providing of the instructions being performed by the one or more programmed computing systems; and after receiving from the user indications of one or more of the multiple account validation identifier candidates and determining that the indicated one or more account validation identifier candidates are the at least one account validation identifier candidates, validating use of the financial account with financial transactions involving the user, the validating of the use of the financial account being performed by the one or more programmed computing systems.

2. The method of claim 1 further comprising, before the initiating steps for the physical delivery of the item to a location associated with the user, generating the item for use in the validating for the financial account.

3. The method of claim 2 wherein the generating of the item includes determining the multiple distinct account validation identifier candidates and printing the multiple distinct account validation identifier candidates on the item.

4. The method of claim 2 wherein the generating of the item includes reproducing a previously existing item and selecting the multiple distinct account validation identifier candidates from information present on the previously existing item.

5. The method of claim 2 wherein the generating of the item includes receiving an indication from the user of an indicated type of item and generating an item of the indicated type.

6. The method of claim 2 wherein the generating of the item includes receiving an indication from the user of one of multiple item options and generating the indicated option.

7. The method of claim 1 wherein the item is a book, and wherein words of the book are the multiple distinct account validation identifier candidates.

8. The method of claim 1 wherein the item is a physical card on which is printed the multiple distinct account validation identifier candidates.

9. The method of claim 8 wherein the item is a scratch card such that at least some of the printed account validation identifier candidates on the card are each obscured by a material that the user can remove via scratching.

10. The method of claim 1 wherein the item includes a detachable portion for return after the user indicates one or more of the account validation identifier candidates on the portion.

11. The method of claim 1 wherein the item includes the instructions and wherein the providing of the instructions occurs as part of the initiating steps for the physical delivery of the item to a location associated with the user.

12. The method of claim 1 wherein the item exists prior to the receiving of the indication of the financial account, and wherein the multiple distinct account validation identifier candidates are each a piece of information that is perceivable from the item.

13. The method of claim 12 further comprising prompting the user to select the item from multiple options before the initiating steps for the physical delivery of the item to a location associated with the user.

14. The method of claim 1 wherein the initiating steps for the physical delivery of the item to a location associated with the user occurs prior to the receiving of the indication of the financial account.

15. The method of claim 1 wherein the location associated with the user is a street address, and wherein the steps for the physical delivery of the item to a location associated with the user includes shipping the item to the street address.

16. The method of claim 1 wherein the steps for the physical delivery of the item includes sending information to the location associated with the user to prompt the user to physically retrieve the item from an indicated location.

17. The method of claim 1 wherein the at least one account validation identifier candidates each include multiple alphanumeric characters.

18. The method of claim 1 further comprising determining the at least one account validation identifier candidates in such a manner as to hinder those account validation identifier candidates from being guessed.

19. The method of claim 1 further comprising determining the at least one account validation identifier candidates in such a manner as to hinder the determined amounts of the one or more deposits from being determined from the at least one account validation identifier candidates.

20. The method of claim 19 wherein the determining of the at least one account validation identifier candidates includes calculating each of those account validation identifier candidates using a one-way hash function whose input is based at least in part on one or more of the determined amounts of the one or more deposits.

21. The method of claim 19 wherein the determining of the at least one account validation identifier candidates includes generating each of those account validation identifier candidates in a manner that is not based on the determined amounts of the one or more deposits.

22. The method of claim 19 further comprising discarding all information about the determined amounts of the one or more deposits before the receiving of the indications of the one or more account validation identifier candidates.

23. The method of claim 1 further comprising, after the validating of the use of the financial account with financial transactions involving the user, using the financial account to provide and/or receive payments on behalf of the user.

24. The method of claim 1 further comprising, if the one or more initiated deposits to the financial account do not succeed, preventing the validating of the use of the financial account with financial transactions involving the user.

25. The method of claim 1 further comprising, if the indicated one or more account validation identifier candidates are not determined to include the at least one account validation identifier candidates, preventing the validating of the use of the financial account with financial transactions involving the user.

26. The method of claim 1 wherein the validating of the use of the financial account includes providing compensation to the user.

27. The method of claim 1 wherein the indicated financial account is a checking account provided by a bank, and wherein the provided instructions for using amounts of one or more indicated deposits include an indication of the initiated one or more deposits and include an indication to use transaction information provided by the bank to identify the amounts of the one or more indicated deposits.

28. A computer-readable medium whose contents include instructions that when executed configure a computing device to perform a method comprising:
  receiving an indication of a financial account of a user for use with financial transactions involving the user; and
  automatically validating use of the financial account by,
    initiating one or more deposits to the financial account for use in validating the financial account, each deposit having a determined amount, the initiating of the one or more deposits being performed by the configured computing device;
    initiating steps for physical delivery of an item to a location associated with the user, the item having multiple distinct account validation identifier candidates for the account such that each of the multiple account validation identifier candidates is identifiable from the item using one or more numerical amounts, at least one of the multiple account validation identifier candidates being identifiable using the determined amounts of the one or more deposits;

providing instructions for identifying one or more of the multiple account validation identifier candidates of the delivered item by using amounts of one or more indicated deposits; and after receiving from the user indications of one or more of the multiple account validation identifier candidates and determining that the indicated one or more account validation identifier candidates are the at least one account validation identifier candidates, validating use of the financial account with financial transactions involving the user, the validating of the use of the financial account being performed by the configured computing device.

29. The computer-readable medium of claim 28 wherein the method further comprises, before the initiating steps for the physical delivery of the item to a location associated with the user, generating the item for use in the validating for the financial account.

30. The computer-readable medium of claim 29 wherein the generating of the item includes determining the multiple distinct account validation identifier candidates and printing the multiple distinct account validation identifier candidates on the item.

31. The computer-readable medium of claim 28 wherein the item includes a detachable portion for return after the user indicates one or more of the account validation identifier candidates on the portion.

32. The computer-readable medium of claim 28 wherein the item includes the instructions, and wherein the providing of the instructions occurs as part of the initiating steps for the physical delivery of the item to a location associated with the user.

33. The computer-readable medium of claim 28 wherein the location associated with the user is a street address, and wherein the steps for the physical delivery of the item to a location associated with the user includes shipping the item to the street address.

34. The computer-readable medium of claim 28 wherein the method further comprises, after the validating of the use of the financial account with financial transactions involving the user, using the financial account to provide and/or receive payments on behalf of the user.

35. The computer-readable medium of claim 28 wherein the indicated financial account is a checking account provided by a bank, and wherein the provided instructions for using amounts of one or more indicated deposits include an indication of the initiated one or more deposits and include an indication to use transaction information provided by the bank to identify the amounts of the one or more indicated deposits.

36. The computer-readable medium of claim 28 wherein the computer-readable medium is at least one of a memory of a computing device and a data transmission medium that stores a generated data signal containing the contents.

37. A computing device, comprising:
one or more memories; and
one or more components configured to, when executed using at least one of the one or more memories:
receive an indication of a financial account of a user for use with financial transactions involving the user; and
automatically validate use of the financial account by, initiating one or more deposits to the financial account for use in validating the financial account, each deposit having an associated monetary amount;

initiating steps for physical delivery of an item to a location associated with the user, the item having multiple distinct account validation identifier candidates for the account such that each of the multiple account validation identifier candidates is identifiable from the item using one or more numerical amounts, at least one of the multiple account validation identifier candidates being identifiable using the associated amounts of the one or more deposits;

providing instructions for identifying one or more of the multiple account validation identifier candidates of the delivered item by using amounts of the initiated one or more deposits; and after receiving from the user indications of one or more of the multiple account validation identifier candidates and determining that the indicated one or more account validation identifier candidates are the at least one account validation identifier candidates, validating use of the financial account with financial transactions involving the user.

38. The computing device of claim 37 wherein the one or more components are further configured to, before the initiating steps for the physical delivery of the item to a location associated with the user, generate the item for use in the validating for the financial account, the generating including determining the multiple distinct account validation identifier candidates and printing the multiple distinct account validation identifier candidates on the item.

39. The computing device of claim 37 wherein the item includes a detachable portion for return after the user indicates one or more of the account validation identifier candidates on the portion.

40. The computing device of claim 39 wherein the item includes the instructions, and wherein the providing of the instructions occurs as part of the initiating steps for the physical delivery of the item to a location associated with the user.

41. The computing device of claim 37 wherein the location associated with the user is a street address, and wherein the steps for the physical delivery of the item to a location associated with the user includes shipping the item to the street address.

42. The computing device of claim 37 wherein the one or more components are further configured to, after the validating of the use of the financial account with financial transactions involving the user, use the financial account to provide and/or receive payments on behalf of the user.

43. The computing device of claim 37 wherein the indicated financial account is a checking account provided by a bank, and wherein the provided instructions for using amounts of one or more indicated deposits include an indication of the initiated one or more deposits and include an indication to use transaction information provided by the bank to identify the amounts of the one or more indicated deposits.

44. The computing device of claim 37 wherein the one or more components include software instructions for execution in memory of the computing device.

45. The computing device of claim 37 wherein the one or more components consist of a means for receiving an indication of a financial account of a user for use with financial transactions involving the user, and automatically validating use of the financial account, the validating of the use of the financial account including:

initiating one or more deposits to the financial account for use in validating the financial account, each deposit having an associated monetary amount;

initiating steps for physical delivery of an item to a location associated with the user, the item having multiple distinct account validation identifier candidates for the account such that each of the multiple account validation identifier candidates is identifiable from the item using one or more numerical amounts, at least one of the multiple account validation identifier candidates being identifiable using the amounts of the one or more deposits;

providing instructions for identifying one or more of the multiple account validation identifier candidates of the delivered item by using amounts of the initiated one or more deposits; and after receiving from the user indications of one or more of the multiple account validation identifier candidates and determining that the indicated one or more account validation identifier candidates are the at least one account validation identifier candidates, validating use of the financial account with financial transactions involving the user.

\* \* \* \* \*

UNITED STATES PATENT AND TRADEMARK OFFICE
CERTIFICATE OF CORRECTION

| | | |
|---|---|---|
| PATENT NO. | : 7,761,353 B1 | Page 1 of 1 |
| APPLICATION NO. | : 11/296095 | |
| DATED | : July 20, 2010 | |
| INVENTOR(S) | : Alexander E. Silverman | |

It is certified that error appears in the above-identified patent and that said Letters Patent is hereby corrected as shown below:

Column 14, Line 53
"initiating physical delivery of an item to a location" should read, --initiating steps for physical delivery of an item to a location--.

Signed and Sealed this
Twenty-ninth Day of March, 2011

David J. Kappos
*Director of the United States Patent and Trademark Office*